(12) United States Patent
Noga

(10) Patent No.: US 7,540,896 B2
(45) Date of Patent: Jun. 2, 2009

(54) AIR HANDLING SYSTEM

(76) Inventor: Michael Noga, 1340 Warwick Avenue, Oakville, Ontario (CA) L6L 2W1

( * ) Notice: Subject to any disclaimer, the term of this patent is extended or adjusted under 35 U.S.C. 154(b) by 435 days.

(21) Appl. No.: 11/124,213

(22) Filed: May 9, 2005

(65) Prior Publication Data
US 2005/0247035 A1  Nov. 10, 2005

Related U.S. Application Data

(60) Provisional application No. 60/568,689, filed on May 7, 2004.

(51) Int. Cl.
*B01D 45/00* (2006.01)
(52) U.S. Cl. .............................. 55/394; 55/434; 96/355
(58) Field of Classification Search .................... 55/318, 55/392, 394, 423, 434, 462, 466, 355, 360

See application file for complete search history.

(56) References Cited

U.S. PATENT DOCUMENTS 5,989,302 A * 11/1999 Krowech ..................... 55/424

* cited by examiner

*Primary Examiner*—Robert A Hopkins

(57) ABSTRACT

The present invention is directed to an apparatus for removing water droplets from an air stream having a high air speed. The apparatus is provided with a plurality of water separators to sequentially reduce the water droplet content of the air stream. Preferably, the apparatus is provided with a first water separator to reduce the water droplet content of the air from water droplets which have been picked up as the air is impacted with a water source. The apparatus is provided with a second water separator over which the air flows to further reduce the water droplet content of the air. An outlet duct beyond the second water separator is provided with a third water separator to further reduce the water droplet content of the air to a level which can be handled by a blower used to draw the air through the apparatus. The present invention also provides a method of separating water droplets from an air stream by passing the air stream over or past a plurality of water traps or separators to sequentially reduce the water droplet content of the air stream.

2 Claims, 4 Drawing Sheets

AIR HANDLING SYSTEM

RELATED APPLICATION DATA

This application is a Continuation of Ser. No. 60/568,689 filed May 7, 2004 which is pending.

FIELD OF THE INVENTION

The present invention relates to an apparatus to remove water droplets from an air stream having a high air speed.

BACKGROUND OF THE INVENTION

Air cleaning or handling systems are well known for many automated manufacturing setups to maintain a clean air environment by removing particles from the air. In some applications, wet scrubbers may be used to clean the air and as a result, the air may be heavily laden with water droplets which must be removed.

This air, heavily laden with water droplets, is passed through a series of closely spaced curved plates which provide a torturous path to separate the water droplets from the air stream and allow the water to drip down. The plates may include chevrons on the sides of the plates to improve the collection efficiency of the water from the air. However, such systems have very slow air speeds generally on the order of 500 feet per minute or less and require frequent disassembly and cleaning to remove the accumulated material from the collection plates.

There thus remains a need for an apparatus for use in air handling equipment which can efficiently remove water droplets from the air stream and overcome the disadvantages of the prior art apparatus.

SUMMARY OF THE INVENTION

The present invention is directed to an apparatus for removing water droplets from an air stream having a high air speed. The apparatus comprises a plurality of water separators to sequentially reduce the water droplet content of the air stream.

In an aspect of the invention, the apparatus includes an inlet to draw air from the environment, the inlet causing the air to interact with a water source whereby the air stream picks up water droplets. The apparatus is provided with a first water separator to reduce the water droplet content of the air from water which has been picked up as the air interacts with the water source. The apparatus is provided with a second water separator to further reduce the water droplet content of the air. The outlet of the apparatus beyond the second water separator is provided with a third water separator to further reduce the water droplet content of the air to a level which can be handled by a blower used to draw the air through the apparatus.

In another aspect of the invention, the apparatus includes an inlet to draw air from the environment, the inlet causing the air to impinge upon a water reservoir contained in a water tank. The water tank is provided with a first water separator through which the air flows to reduce the water droplet content of the air from water which has been picked up as the air is impinged on the water reservoir. The outlet of the water tank is provided with a second water separator over which the air flows to further reduce the water droplet content of the air. The outlet duct beyond the second water separator is provided with a third water separator to further reduce the water droplet content of the air to a level which can be handled by a blower used to draw the air through the apparatus.

In a further aspect of the invention, there is provided a water separator for separating water droplets from an air stream. The water separator comprising a deflector plate angled along the air flow to cause the air to impinge upon the deflector plate, change direction and cause water droplets which accumulate on the plate to be removed from the air stream. The water separator may further include a sill plate of a height equal to or slightly greater than the deflector plate slightly downstream of the deflector plate to trap the water droplets which are removed from the air stream.

In yet a further aspect of the invention, there is provided a water separator to separate water droplets from an air stream. The water separator comprises an air foil provided on a wall of a duct with openings to allow the air to pass through while collecting water droplets which flow along the wall of the duct.

In an aspect of the invention, there is provided a method of separating water droplets from an air stream by passing the air stream over or past a plurality of water traps or separators to sequentially reduce the water droplet content of the air stream.

BRIEF DESCRIPTION OF THE DRAWINGS

Preferred embodiments of the present invention are illustrated in the attached drawings in which.

DETAILED DESCRIPTION OF THE PREFERRED EMBODIMENTS

Figure 1:
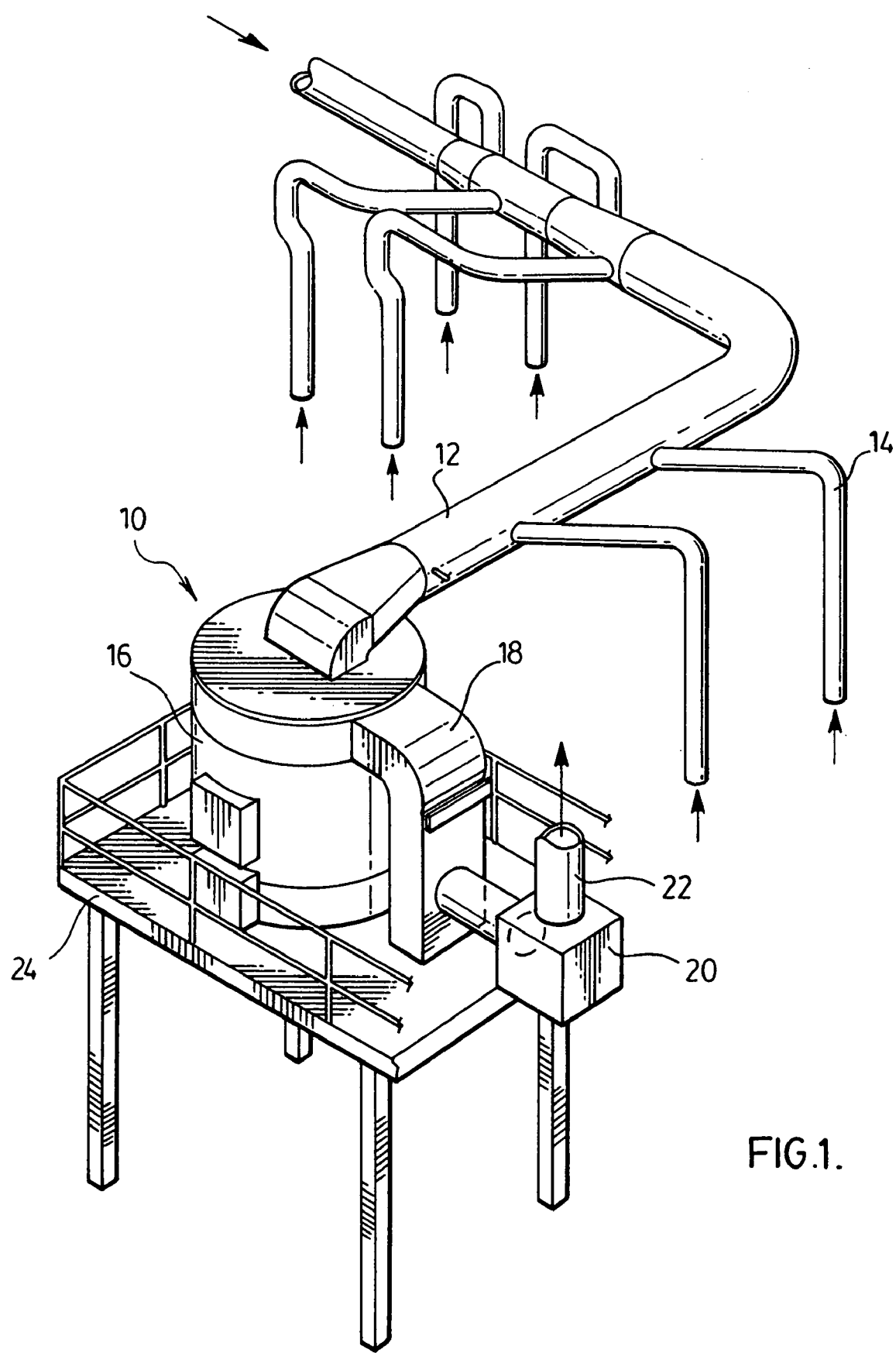
FIG. 1 is a perspective view of an apparatus according to a preferred embodiment of the present invention.

A preferred embodiment of an apparatus to remove water droplets from an air stream is illustrated in the attached drawings. In the embodiment illustrated, the apparatus is a wet scrubber air handling apparatus 10. The air handling apparatus 10 illustrated comprises inlet ducting 12 to draw air from one or more sources by individual inlets 14. The inlet ducting 12 feeds into a water tank 16, the outlet of which is connected to outlet ducting 18 containing water traps as will be described further below. The outlet ducting 18 then connects to a fan 20 which exhausts the air to the exterior of the building through duct 22.

The wet scrubber air handling system 10 of the preferred embodiment of the present invention provides for a high air speed while removing water droplets from the air steam. This high air speed is greater than one thousand feet per minute and can be several thousand feet per minute. This is a significant improvement over the prior art systems which generally had slow speeds of about five hundred feet per minute.

In order to save floor space it is preferred if the air handling apparatus 10 is mounted above the manufacturing stations. In many factories a mezzanine 24 is provided above the automated line and the air handling apparatus 10 may be easily installed on the mezzanine level 24 such that valuable factory floor space is not utilized.

Figure 2:
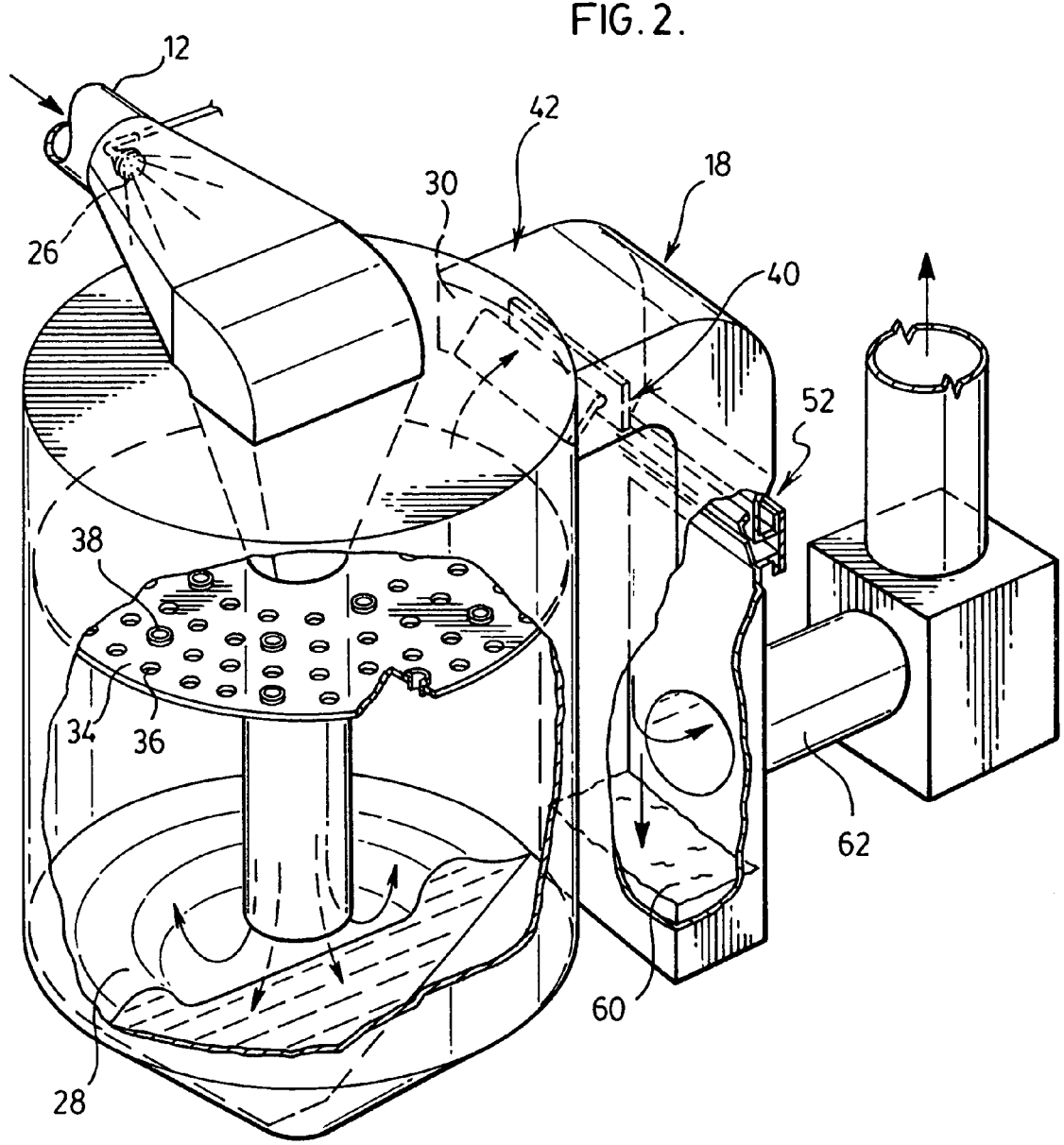
FIG. 2 is a perspective view in section of the apparatus of FIG. 1.

The operation of the apparatus of the preferred embodiment of the present invention will be described with respect to the drawings, particularly FIG. 2. The air from the manufacturing apparatus enters the inlet duct 12. This air is generally contaminated with particulate matter. In some embodiments, it may be advisable to provide for a water spray 26 in the inlet duct 12 to improve collection efficiency. The air from the inlet duct 26 impinges upon a water reservoir 28 contained within the water tank 16. Heavier particles in the inlet air are generally captured within the water reservoir 28 of the water tank 16 as they can not easily make the abrupt change in direction required to go to the outlet 30 of the water tank 16. In addition, as the air impinges upon the water reservoir 28 in the water tank 16 the air picks up water droplets which must be removed prior to the air encountering the blower fan 20.

A first separation of the water droplets contained within the air after it is impinged upon the water reservoir 28 is accomplished by means of a first water separator 32. In the embodiment illustrated, the first water separator 32 is a diffuser plate 34 mounted within the water tank 16. Preferably, the diffuser plate 34 is provided with a plurality of holes or openings 36 that the airflow must pass through. As the air impacts upon the diffuser plate 34, some of the liquid in the air is maintained on the plate 34 rather than passing through the openings 36 and will eventually flow back along the wall of the water tank 16 or fall into the water reservoir 28. In order to improve this separation, the openings 36 of the diffuser plate are preferably provided with extending walls or shoulders 38 such that any air impacting upon the plate 34 must change direction to flow around the opening 36 or shoulder 38. More preferably, the walls or shoulders 38 extend on both sides of the plate 34 to eliminate reintraiment of the collected water into the air stream. The heavier water particles are not easily able to make this transition and thus collect on the surface of the plate 34 to eventually return to the water reservoir 28. The number of openings 36 and their size may be adjusted depending upon the desired air flow.

Figure 3:
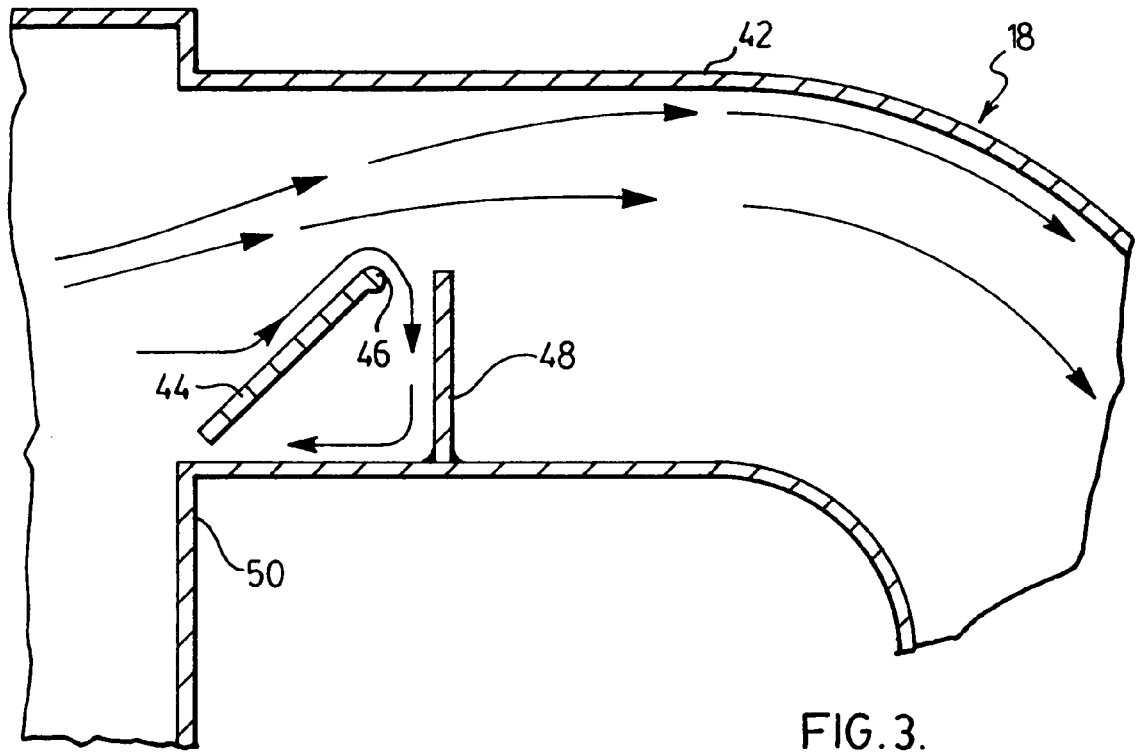
FIG. 3 is a cross section view of a first water trap for use in the apparatus of the present apparatus.

A secondary liquid separation is provided by means of a second water trap 40 which is preferably installed in the exhaust elbow 42 of the outlet ducting 18 leading from the water tank 16. As illustrated in detail in FIG. 3, this water trap 40 in one embodiment is provided as a deflector plate 44 angled along the airflow direction. The deflector plate 44 is provided with a curved over top 46 to cause the water droplets to flow over the curve and impact on the sill plate 48. This is accomplished in part due to the surface tension between the water droplets and the deflector plate 44. In order to increase this surface tension, the plate 44 can be manufactured of materials which have an appropriate surface tension. Preferably, the plate 44 is polyethylene or stainless steel, particularly surface treated stainless steel. The sill 48 has a height at least equal to and preferably slightly greater than the height of the deflector plate 44 to collect the water droplets and to prevent them from being carried by the air stream over the sill 48. The air containing the water droplets impinge upon the deflector plate 44. As a result of the airflow impinging upon the plate, water droplets which are too heavy to make the abrupt change in direction collect on the deflector plate 44, flow along the deflector plate 44, impact on and are trapped by the perpendicularly oriented sill 48. The collected liquid flows back to the chamber along the wall 50 and is returned to the water reservoir 28.

Figure 4:
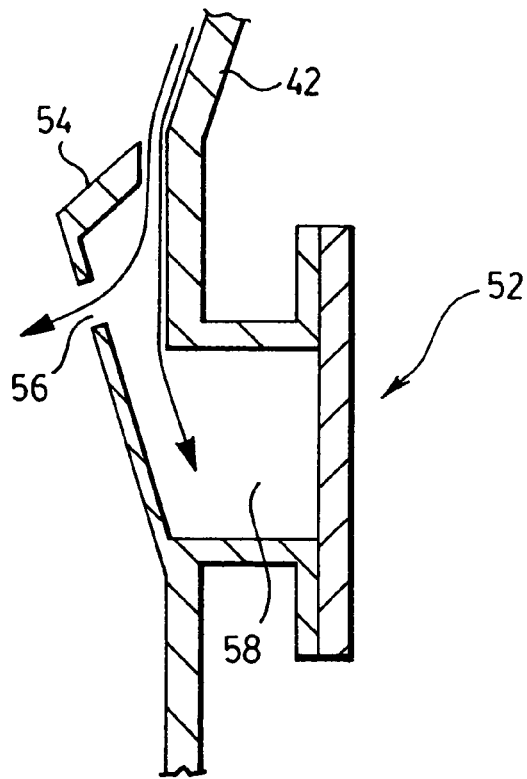
FIG. 4 is a cross section view of a second water trap for use in the apparatus of the present apparatus.

The air flowing through the exhaust elbow 42 is deflected upwardly by the deflector plate 46 and impinges upon the wall of the elbow 42. This also aids in liquid separation as the water droplets which were small enough to bypass the deflector plate 46 are still too heavy to make the abrupt change in direction as the air flows around the elbow 42. These water droplets collect on the outer surface of the elbow 42, flow along the outer surface of the elbow 42 and are captured by a third water trap 52. As illustrated in FIG. 4, the third water trap is preferably provided as an air foil shape 54 with openings 56 to allow the air that passes through the gap between the elbow wall and the air foil 54 to exit from the water trap 52 while the water droplets flowing along the surface of the elbow 42 drop into the collection chamber 58 and then return to the water tank 16 by suitable piping. The air foil shape 54 provides a negative pressure along the back side, causing the water droplets to flow into the collection chamber 58. If the openings 56 are not provided to produce this negative pressure, the water droplets would flow over the surface of the plate 54 and continue along and would not be collected by the water trap 52.

Further liquid separation occurs when water droplets which collect on the walls of the vertical ducts 18 below the elbow 42 can continue to flow down the surface of the duct and are collected in the bottom 60 of the vertical duct and piped back to the water vessel. The conditioned air is drawn from the outlet piping 62 into the fan 20 and either exhausted or returned as clean air into the shop environment.

The apparatus of the present invention permits efficient separation of water droplets from an air stream, while achieving high flow rates of the air through the apparatus. While the embodiment described above introduces the water droplets through the air impinging upon a water reservoir, the ways of having the air interact with a water source to pick up water droplets would be apparent to those skilled in the art.

Figure 5:
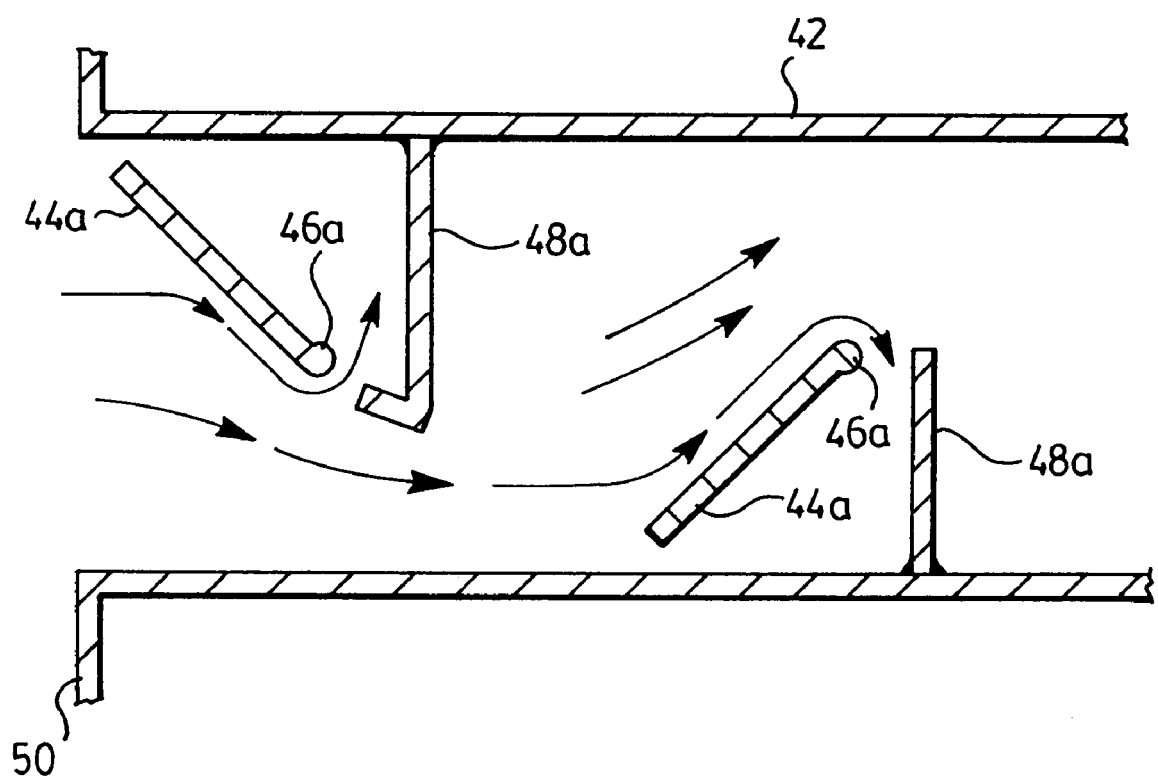
FIG. 5 is a cross section view of an alternative arrangement of the water trap of an apparatus of the present invention.

While the embodiment described above is provided with different structures of water traps, the apparatus of the present invention may be provided with a plurality of water traps of the same structure. For example, as shown in FIG. 5 the apparatus may be provided with two or more deflector plate style water traps 40. In this embodiment, the deflector plates 46a and 46b are provided on opposite walls slightly offset to force the air stream flowing over the first plate 46a to impinge upon the second deflector plate 46b and help increase the removal of the water droplets form the air stream. In a like manner, the apparatus may be provided with two or more airfoil style water traps 52.

The different types of water traps utilizing the apparatus of the present invention can also be utilized individually or collectively in other apparatus to provide for removal of water droplets from an air stream, particularly an air stream traveling at a high speed. The design of the individual water traps of the present invention provide for efficient removal of water droplets from an air stream.

Preferably, the components of the apparatus of the present invention, i.e. tank and ducts are constructed of rotomolded plastic, particularly rotomolded polyethylene. Such a construction provides numerous benefits as compared to fiberglass or steel components of the prior art. The advantages include reduced cost of manufacturing the component. In addition, polyethylene is non-corrosive, chemically inert and has high impact resistance, all leading to an increased life for the components. In addition to the components of the apparatus of the present invention, the manufacturing of the component parts of other apparatus such as other designs of wet scrubbers and cyclonic separators would also benefit from the advantages of rotomolding of plastics, particularly polyethylene. The use of rotomolded plastic also makes fabrication of intricate shaped components easier.

Although various preferred embodiments of the present invention have been described herein in detail, it would be appreciated by those skilled in the art that variations may be made thereto without departing from the spirit of the invention or the scope of the appended claims.

I claim:

1. A water separator to reduce the water droplet content of an air stream containing water droplets, the water separator comprising an air foil provided on a wall of a duct along which the air stream flows, the air foil being provided with a first opening between a top edge of the air foil and the wall of the duct to allow water droplets to flow along the wall of the duct and a second opening in the air foil below the first opening to allow air to pass through the airfoil while collecting water droplets which flow along the wall of the duct.

2. A water separator according to claim 1 wherein the wall of the duct below the first opening between the top edge of the air foil and the wall of the duct is provided with a collection chamber to collect the water droplets.

* * * * *